(12) United States Patent
Golin et al.

(10) Patent No.: US 9,103,252 B2
(45) Date of Patent: Aug. 11, 2015

(54) MODULAR EXHAUST TREATMENT SYSTEM

(71) Applicant: Tenneco Automotive Operating Company Inc., Lake Forest, IL (US)

(72) Inventors: Michael Golin, Dexter, MI (US); Guanyu Zheng, Grass Lake, MI (US); Timothy P. Gardner, Canton, MI (US); Paul Majewski, Whitmore Lake, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 39 days.

(21) Appl. No.: 13/833,574

(22) Filed: Mar. 15, 2013

(65) Prior Publication Data

US 2014/0260205 A1 Sep. 18, 2014

(51) Int. Cl.
*F01N 3/00* (2006.01)
*F01N 3/08* (2006.01)
*F01N 3/20* (2006.01)
*F01N 3/021* (2006.01)
*F01N 13/00* (2010.01)

(52) U.S. Cl.
CPC *F01N 3/08* (2013.01); *F01N 3/021* (2013.01); *F01N 3/2066* (2013.01); *F01N 13/009* (2014.06); *F01N 13/017* (2014.06); *F01N 2470/18* (2013.01); *F01N 2590/02* (2013.01); *F01N 2590/08* (2013.01); *F01N 2590/10* (2013.01); *Y02T 10/24* (2013.01)

(58) Field of Classification Search
USPC ........... 60/286, 295, 297, 299, 301, 302, 303, 60/323, 324
See application file for complete search history.

(56) References Cited

U.S. PATENT DOCUMENTS

| | | | |
|---|---|---|---|
| 5,693,295 A * | 12/1997 | Foster | 422/180 |
| 6,622,482 B2 | 9/2003 | Knight et al. | |
| 7,703,277 B2 * | 4/2010 | Ueda et al. | 60/286 |
| 8,220,252 B2 | 7/2012 | Roach | |
| 8,261,542 B2 * | 9/2012 | Yager | 60/320 |

(Continued)

FOREIGN PATENT DOCUMENTS

| | | |
|---|---|---|
| DE | 202009012225 | 12/2009 |
| JP | 2012-525540 | 10/2012 |
| WO | WO2014056877 | 4/2014 |

OTHER PUBLICATIONS

Sinzenich et al., "Selective Catalytic Reduction: Exhaust Aftertreatment for Reducing Nitrogen Oxide Emissions", MTU, pp. 1-4 (Aug. 2011).

(Continued)

*Primary Examiner* — Binh Q Tran
(74) *Attorney, Agent, or Firm* — Harness, Dickey & Pierce, P.L.C.

(57) ABSTRACT

A modular exhaust after-treatment system including a plurality of exhaust after-treatment modules. Each module includes a housing defining a non-linear flow path arranged between an inlet passage and an outlet passage. The non-linear flow path includes a first portion adjacent the inlet passage that includes a first exhaust treatment component, a second portion downstream from the first portion, and a third portion downstream from second portion adjacent the outlet passage, wherein the third portion includes a second exhaust treatment component. The plurality of exhaust after-treatment modules are secured to each other in either horizontally or vertically.

15 Claims, 8 Drawing Sheets

(56) References Cited

U.S. PATENT DOCUMENTS

| | | | |
|---|---|---|---|
| 8,341,946 B2* | 1/2013 | Harmsen | 60/297 |
| 8,516,802 B2* | 8/2013 | Kotrba et al. | 60/292 |
| 8,596,049 B2* | 12/2013 | Isada et al. | 60/302 |
| 8,747,788 B1* | 6/2014 | Baig et al. | 423/212 |
| 8,752,370 B2* | 6/2014 | Hittle et al. | 60/324 |
| 2008/0141663 A1* | 6/2008 | Ono | 60/311 |
| 2010/0269492 A1 | 10/2010 | Kotrba et al. | |
| 2011/0047973 A1 | 3/2011 | Wilhelm et al. | |
| 2011/0146253 A1 | 6/2011 | Isada et al. | |
| 2011/0173953 A1 | 7/2011 | Neels et al. | |
| 2012/0096833 A1 | 4/2012 | Tan et al. | |
| 2012/0124982 A1 | 5/2012 | Bell et al. | |
| 2012/0210697 A1 | 8/2012 | Garimella et al. | |
| 2013/0199160 A1 | 8/2013 | Kruer et al. | |

OTHER PUBLICATIONS

Company Profile of Cummins Inc., Product/Company News, Tier 4 Final QSK Engine, Diesel & Gas Turbine Publications, www.gsgnet.net, printed Nov. 9, 2012.

* cited by examiner

MODULAR EXHAUST TREATMENT SYSTEM

FIELD

The present disclosure relates to a modular exhaust after-treatment system.

BACKGROUND

This section provides background information related to the present disclosure which is not necessarily prior art.

Large-scale diesel engines used in locomotives, marine applications, and stationary applications can have exhaust flow rates that exceed the capacity of a single exhaust line. The exhaust system used for each of the above-noted applications, therefore, can be designed to be multi-leg system having a plurality of exhaust lines that each includes an exhaust after-treatment system. Due to various packaging constraints that may exist in a respective application, however, linear exhaust after-treatment lines may not be feasible. It has recently become necessary, therefore, to develop exhaust after-treatment systems that can effectively treat the exhaust in a non-linear configuration.

SUMMARY

This section provides a general summary of the disclosure, and is not a comprehensive disclosure of its full scope or all of its features.

The present disclosure provides a modular exhaust after-treatment system. The modular exhaust after-treatment system includes a plurality of exhaust after-treatment modules. Each module includes a housing defining a non-linear flow path arranged between an inlet passage and an outlet passage. The non-linear flow path includes a first portion adjacent the inlet passage that includes a first exhaust treatment component, a second portion downstream from the first portion, and a third portion downstream from second portion adjacent the outlet passage, wherein the third portion includes a second exhaust treatment component. The plurality of exhaust after-treatment modules are secured to each other in either horizontally or vertically.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
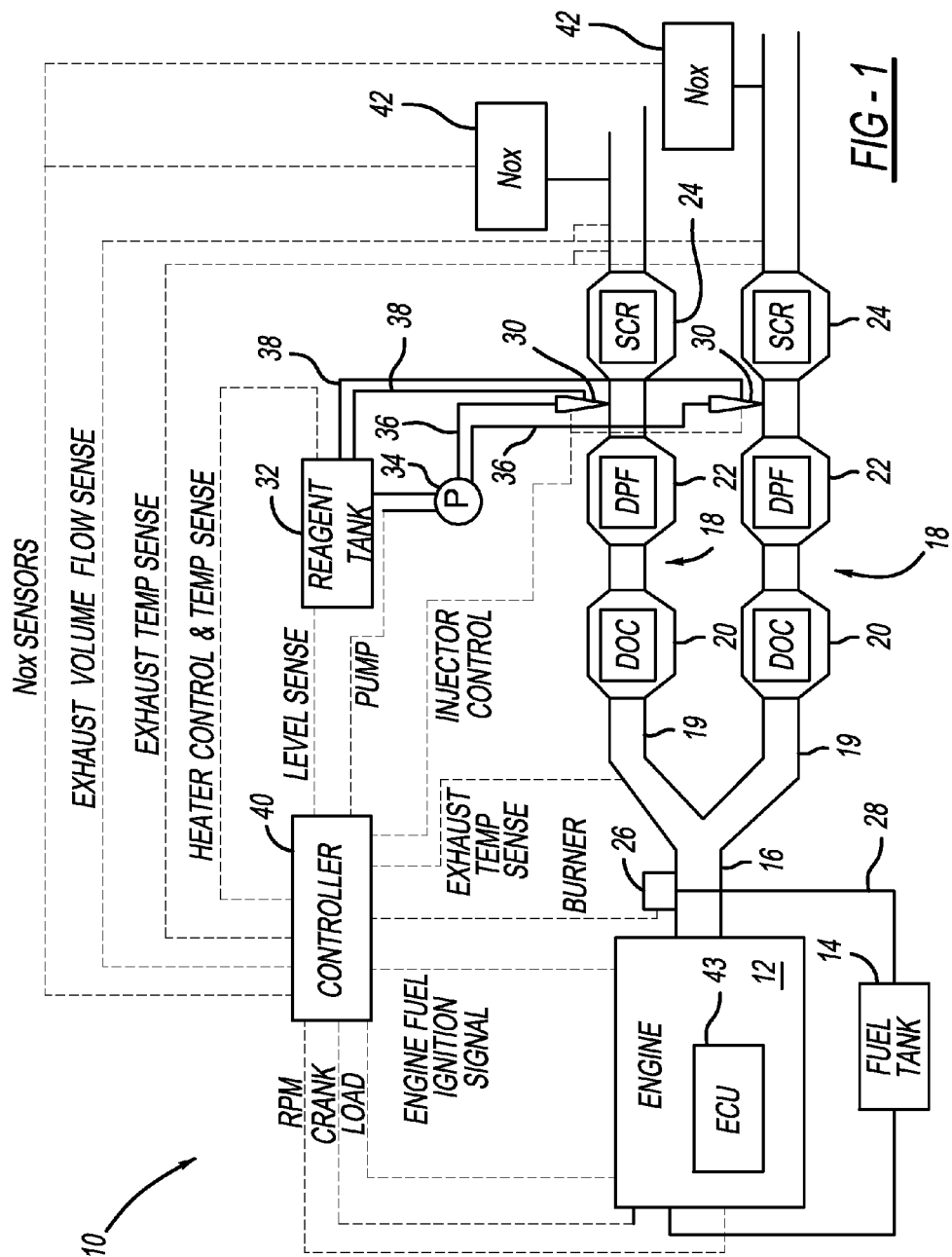
FIG. 1 is a schematic representation of an exhaust system according to a principle of the present disclosure.

FIG. 1 is a schematic representation of an exhaust system 10 according to the present disclosure. Exhaust system 10 includes at least an engine 12 in communication with a fuel source 14 that, once consumed, will produce exhaust gases that are discharged into an exhaust passage 16 including an exhaust after-treatment system 18. Exhaust system 10 can be designed to be multi-leg system having a plurality of exhaust lines 19 each including an after-treatment system 18. Although only a pair of exhaust lines 19 are illustrated in FIG. 1, it should be understood that a greater number of exhaust lines 19 can be used without departing from the scope of the present disclosure dependent on the size of engine 12 and the exhaust flow rates produced.

Each exhaust after-treatment system 18 may include a diesel oxidation catalyst (DOC) component 20, a diesel particulate filter (DPF) component 22, and a selective catalytic reduction (SCR) component 24. Exhaust after-treatment systems 18 may further include components such as a thermal enhance device or burner 26 to increase a temperature of the exhaust gases passing through exhaust passage 16. Increasing the temperature of the exhaust gas is favorable to achieve light-off of the catalyst in DOC and SCR components 20 and 24 in cold-weather conditions and upon start-up of engine 12, as well as initiate regeneration of DPF 22 when required. To provide fuel to burner 26, the burner can include an inlet line 28 in communication with fuel source 14.

DPF 22 may be desired as an exhaust treatment component to filter soot and any other particulate matters present in exhaust 14. When soot and the other particulate matter begins to clog the tiny pores (not shown) of the DPF 22, however, the DPF 22 can be cleaned (i.e., regenerated) by raising the temperature of the exhaust to burn off the excess soot and particulate matter from DPF 22. For the above reasons, burner 26 is preferably located upstream from each of DOC 20, SCR 24, and DPF 22. It should be understood, however, that DPF 22 may be located upstream of both DOC 20 and SCR 24 and include its own designated burner for regeneration purposes, while a second burner (not shown) can be located upstream of both DOC 20 and SCR 24. Another alternative is for each of DOC 20, SCR 24, and DPF 22 to include a designated burner.

To assist in reduction of the emissions produced by engine 12, exhaust after-treatment system 18 can include dosing modules 30 for periodically injecting exhaust treatment fluids into the exhaust stream. Dosing modules 30 can be used to inject an exhaust treatment fluid such as urea into exhaust passage 16 at a location upstream of SCR 24. Dosing modules 30 are in communication with a reagent tank 32 via a pump 34 and inlet lines 36. Dosing modules 30 also are in communication with tank 32 via return line 38. Return line 38 allows for any urea not injected into the exhaust stream to be returned to tank 32. Flow of urea through inlet line 36, dosing module 30, and return line 38 also assists in cooling dosing module 30 so that dosing module 30 does not overheat. Dosing modules 30, however, can also be provided with a cooling jacket (not shown) that provides a coolant to dosing modules 30.

The amount of exhaust treatment fluid required to effectively treat the exhaust stream may vary with load, engine speed, exhaust gas temperature, exhaust gas flow, engine fuel injection timing, desired $NO_x$ reduction, barometric pressure, relative humidity, EGR rate and engine coolant temperature. A controller 40 may be provided to monitor each of these variables. A $NO_x$ sensor or meter 42 may be positioned downstream from SCR 24. $NO_x$ sensor 42 is operable to output a signal indicative of the exhaust $NO_x$ content to either controller 40 or an engine control unit 43. All or some of the engine operating parameters may be supplied from engine control unit 42 via the engine/vehicle databus to controller 40. The controller 40 could also be included as part of the engine control unit 43. Exhaust gas temperature, exhaust gas flow and exhaust back pressure and other vehicle operating parameters may be measured by respective sensors, as indicated in FIG. 1.

Now referring to FIGS. 2-6, an exemplary modular exhaust after-treatment system 50 including at least one after-treatment module 52 according to a principle of the present disclosure is illustrated. Modular exhaust after-treatment system 50 can replace the linear exhaust lines 19 illustrated in FIG. 1, and are designed for applications where packaging constraints exist. It should be exhaust system 10 can include a single after-treatment module 52 or a plurality of the after-treatment modules 52 without departing from the scope of the present disclosure. The number of after-treatment modules 52 can depend on the size of engine 12. For example, if engine 12 is a one mega-watt engine, a single after-treatment module 52 can be used. If engine 12 is a two mega-watt engine, a pair of after-treatment modules 52 (e.g., FIGS. 2 and 3) can be used, and so on. It will be appreciated that engine size is not the only factor to determine the number of after-treatment modules 52 to be used. Other factors include the type of engine being used and the particular emission control regulations in effect.

Figure 2:
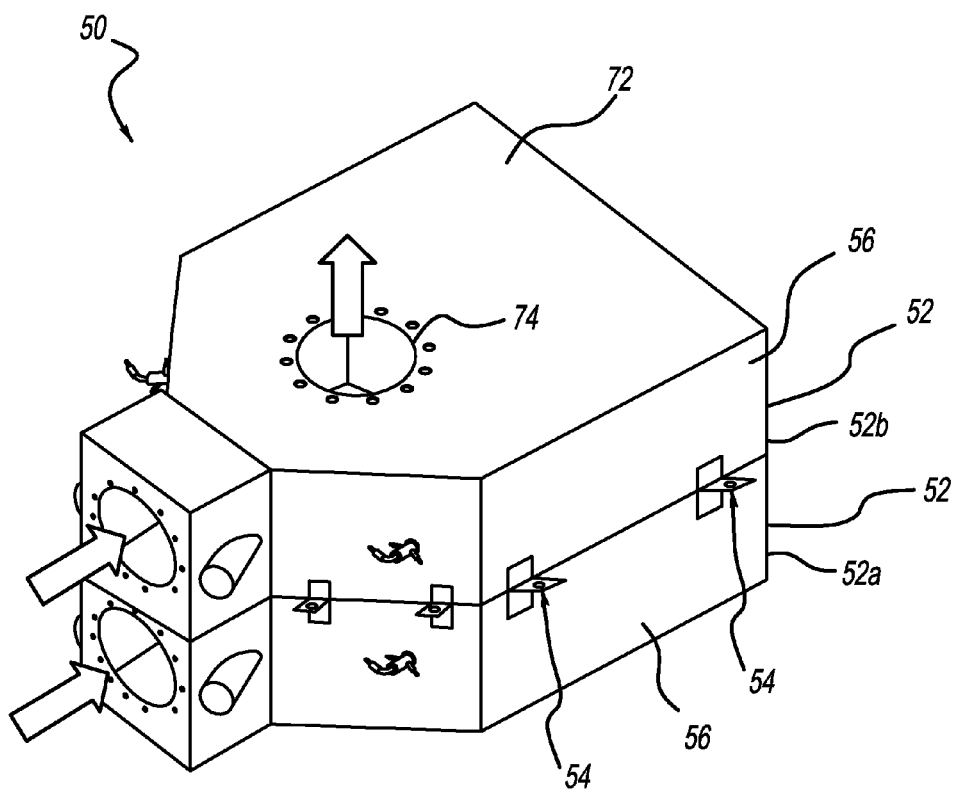
FIG. 2 is a perspective view of a modular exhaust after-treatment system in accordance with a principle of the present disclosure.
Figure 3:
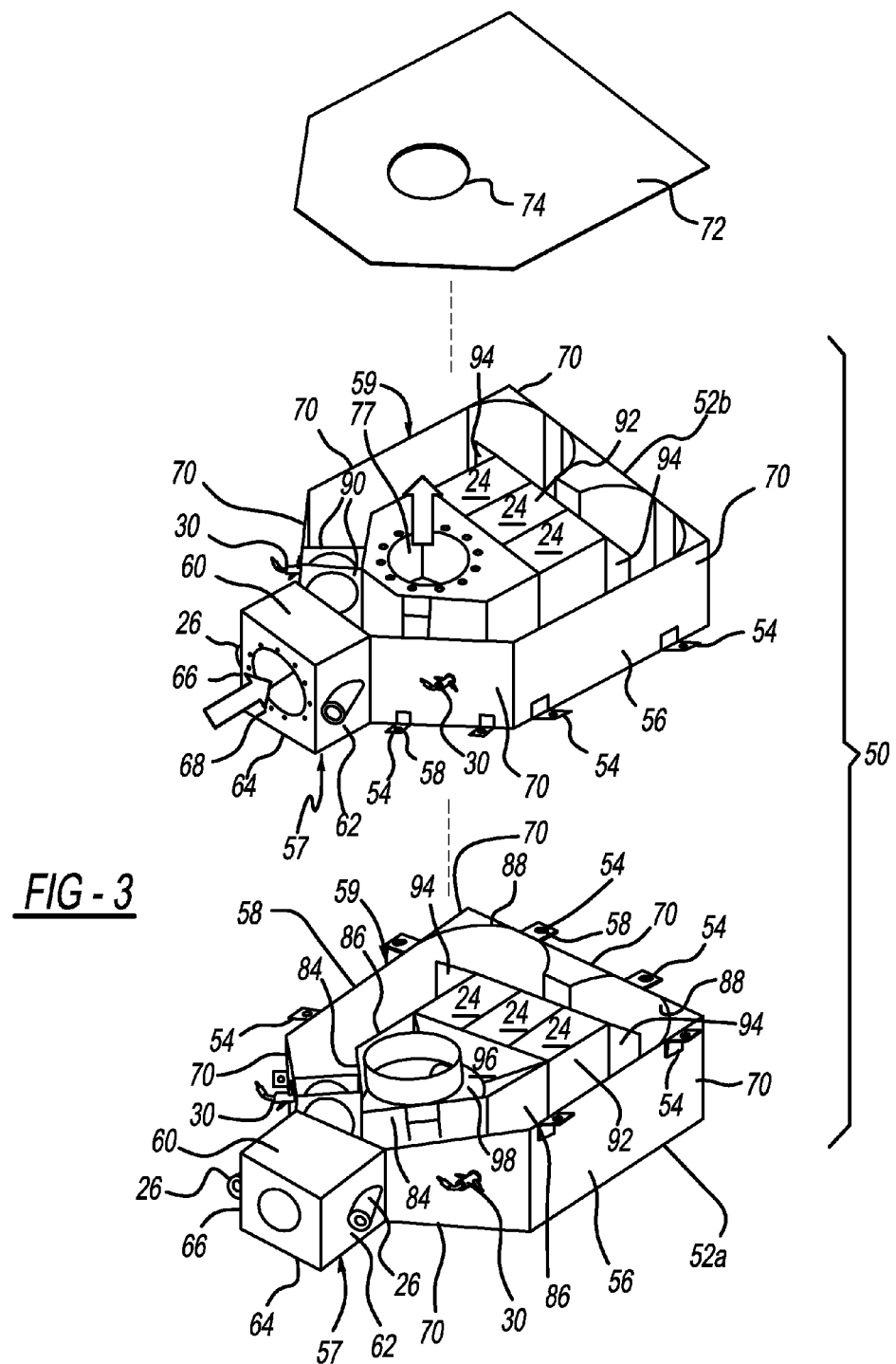
FIG. 3 is an exploded perspective view of the modular exhaust after-treatment system illustrated in FIG. 2.

As best shown in FIGS. 2 and 3, modular after-treatment system 50 includes a pair of after-treatment modules 52a and 52b. Modules 52a and 52b can be secured together in a stacked arrangement using L-shaped mounting brackets 54. L-shaped mounting brackets 54 are formed about a periphery 56 of modules 52a and 52b, and may be secured to modules 52a and 52b by welding, brazing, or any other attachment method suitable to ensure that mounting brackets 54 remain secured to modules 52a and 52b. A through-hole 58 (FIG. 3) can be formed in each bracket 54 for receipt of a fastener (not shown) such a bolt or clamp that can rigidly secure each module 52a and 52b together.

Modules 52a and 52b each include an inlet passage 57 connected to housing 59. Inlet passages 57 are in communication with exhaust passage 16 through, for example, a manifold (not shown). Inlet passage 57 can be polygonal in shape, but may also be cylindrical without limitation. As best shown in FIG. 3, inlet passage 57 includes first, second, third and fourth surfaces 60, 62, 64, and 66 that define a square or rectangular inlet passage 57. A mounting plate 68 allows a portion of exhaust passage 16 to be rigidly secured to inlet passage 57.

Housing 59 may comprise a plurality of exterior walls 70. A pair of cover plates 72 encloses and seals module housing 59. A centrally-disposed aperture 74 may be formed in each cover plate 72 to allow for a central discharge passage 77 to be formed in each module 52a and 52b. Inlet passage 57, mounting plate 68, exterior walls 70, and cover plates 72 may be formed of materials such as steel, aluminum, or any other type of material known to one skilled in the art that are able to withstand exposure to exhaust produced by engine 12 and exhaust treatment fluids that are used to treat the exhaust.

Inlet passage 57 can include a pair of thermal enhancement devices or burners 26 located opposing surfaces (e.g., second and fourth surfaces 62 and 66). Burners 26 raise exhaust temperatures as the exhaust enters modules 52a and 52b to achieve light-off of the catalyst coated DOCS 20. Alternatively, if modules 52a and 52b include DPFs 22, burners 26 can be used to regenerate the DPFs 22. Although a pair of burners 26 are illustrated in the figures, it should be understood that a single burner 26 may be sufficient to raise exhaust temperatures if desired.

Module housing 59 is in fluid communication with inlet passage 57 and can be configured to divide the exhaust flow into a pair of flow paths 75. Interior walls in conjunction with exterior walls 70 divide the exhaust flow into flow paths 75. Flow paths 75 can include first, second, and third portions 78, 80, and 82. First portion 78 of flow path 75 travels along first interior walls 84 that divert flow path 75 away from an axis A inlet passage 56. Second portion 80 of flow path 75 travels along second interior walls 86 in a direction parallel with axis A. Lastly, third portion 82 of flow path 75 travels along third interior walls 88. Third interior walls 88 can have a radius of curvature that initially diverts the exhaust flow in a direction back toward axis A, and then finally diverts the exhaust flow in a direction opposite to that which the exhaust enters inlet passage 56. The configuration of flow paths 75 assists in lengthening the distance the exhaust must flow before being treated by the various exhaust treatment components.

A DOC 20 may be located in each flow path 75. In the illustrated embodiment, DOCS 20 are located in first portions 78 of flow paths 75. A pair of mounting brackets 90 are used to support DOC 22 in housing 59 in first portion 78. Mounting brackets 90 may be welded between exterior wall 70 and first interior wall 84, or secured to exterior wall 70 and first interior wall 84 in any manner known to one skilled in the art. Although not illustrated in FIGS. 2-6, it should be understood that a DPF 22 can also be disposed in each flow path 75, if desired. Further, although DOC 20 is illustrated as being positioned in first portion 78, it should be understood that DOC 20 may located at a position further downstream without departing from the scope of the present disclosure.

Dosing modules 30 are located downstream from DOC 20 for dosing an exhaust treatment fluid such as urea into the exhaust stream. In the illustrated embodiment, dosing modules 30 are illustrated as being positioned to dose exhaust treatment fluid into first portion 78. Dosing modules 30, however, may also be positioned relative to second and third portions 80 and 82 as well.

An array 92 including a plurality of SCRs 24 is located downstream from dosing modules 30 where third portions 82 of flow paths 75 converge. Although six SCRs 24 are illustrated in FIGS. 2-5, it should be understood that any number of SCRs 24 can be used without departing from the scope of the present disclosure. Furthermore, although the SCRs 24 are illustrated as being parallelpiped, it should be understood that cylindrical SCRs 24 may also be utilized. After passing through SCRs 24, exhaust enters discharge passage 77 where it may be expelled to the atmosphere in a direction transverse to flow paths 75.

Although not illustrated in the drawings, it should be understood that a mixing device can be located in flow path 75 at a position between dosing modules 30 and SCRs 24. Mixing devices assist in ensuring satisfactory intermingling of the exhaust and exhaust treatment fluid before entry into SCRs 24 where $NO_X$ is removed from the exhaust stream. Another alternative for mixing the exhaust treatment fluid and exhaust is to incorporate a restrictor plate 94 between second and third portions 80 and 82. Restrictor plate 94 can be a in the form of a solid plate that reduces a width of flow paths 75 up to 50%. By narrowing flow paths 75, the flow velocity of the exhaust stream increases, which increases the intermingling between the exhaust treatment fluid and the exhaust.

Figure 4:
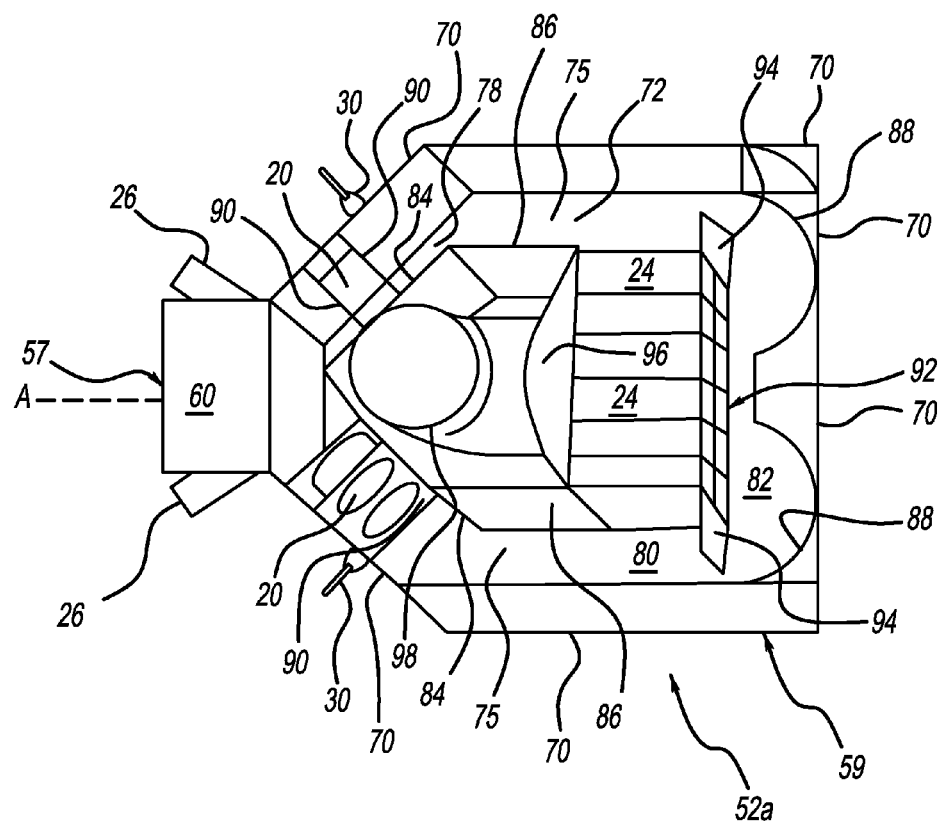
FIG. 4 is a perspective view of an exhaust after-treatment module used in the modular exhaust after-treatment system illustrated in FIG. 2.
Figure 5:
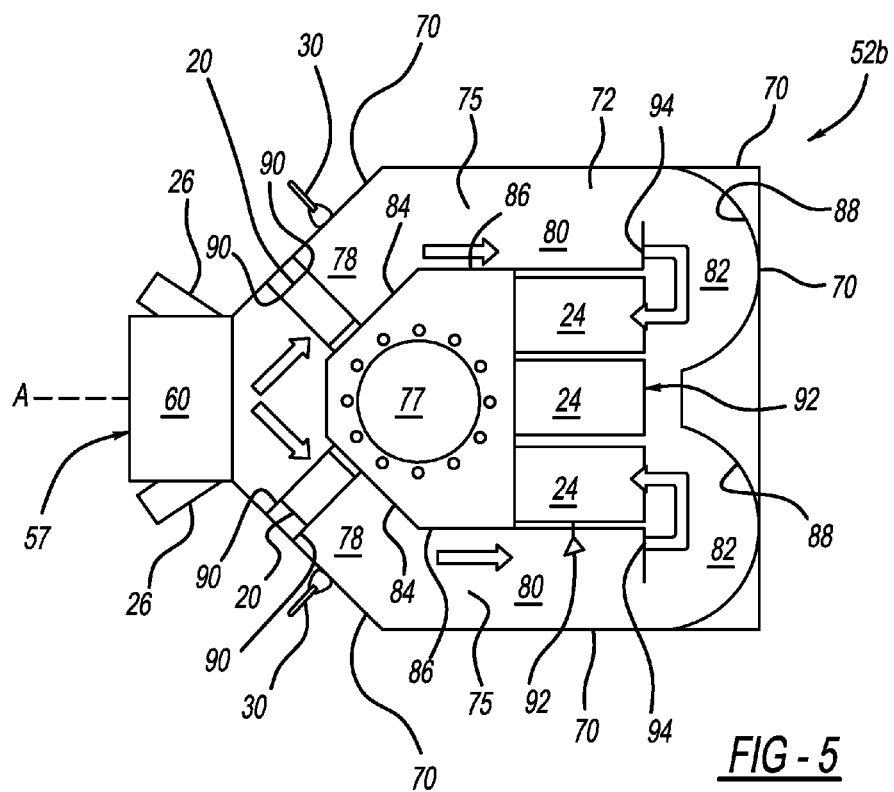
FIG. 5 is a top perspective view of another module, with a cover plate removed, used in the modular exhaust after-treatment system illustrated in FIG. 2.
Figure 6:
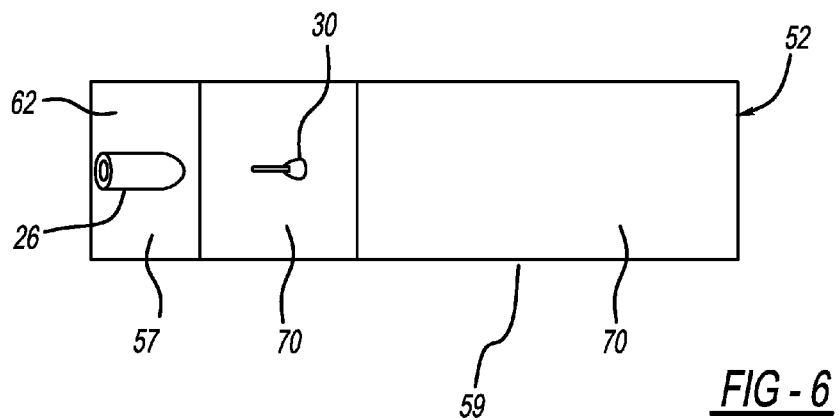
FIG. 6 is a side perspective view of the module illustrated in FIG. 5.

Discharge passages 77 of each module 52 may be in fluid communication with each other. As best illustrated in FIGS. 3 and 4, module 52a, which may be located at the bottom in the stacked arrangement, can include a discharge manifold 96. A discharge conduit 98 communicates with discharge manifold 96. Discharge manifold 96 collects the treated exhaust gases after exiting SCRs 24 and feeds the discharge conduit 98. Discharge conduit 98 communicates with discharge passage 77 of module 52b, which communicates with the discharge passage 77 of another module 52 (if modular exhaust treatment system 50 includes more than two modules 52) or be emitted into the atmosphere. Although not illustrated in FIG. 2, it should be understood that an outlet conduit can be in communication with discharge passage 77 of module 52b and the atmosphere.

Now referring to FIGS. 7-11, another modular exhaust after-treatment system 100 is illustrated. Modular exhaust after-treatment system 100 includes at least one after-treatment module 102 according to a principle of the present disclosure is illustrated. Similar to modular exhaust after-treatment system 50, modular exhaust after-treatment system 100 can replace the linear exhaust lines 19 illustrated in FIG. 1, and are designed for applications where packaging constraints exist. It should be exhaust system 10 can include a single after-treatment module 102 or a plurality of the after-treatment modules 102 without departing from the scope of the present disclosure. The number of after-treatment modules 102 can depend on the size of engine 12.

Figure 7:
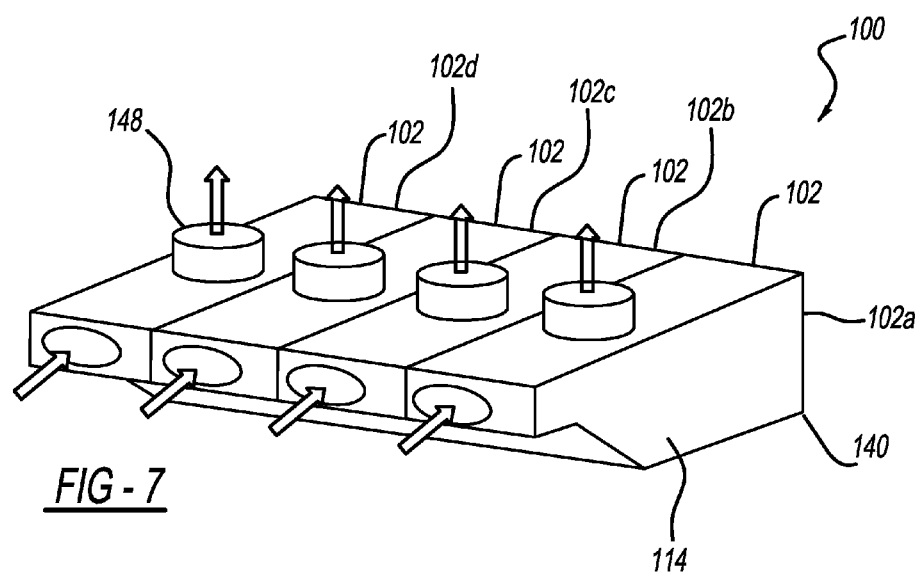
FIG. 7 is a perspective view of a horizontally-configured modular exhaust after-treatment system in accordance with a principle of the present disclosure.
Figure 8:
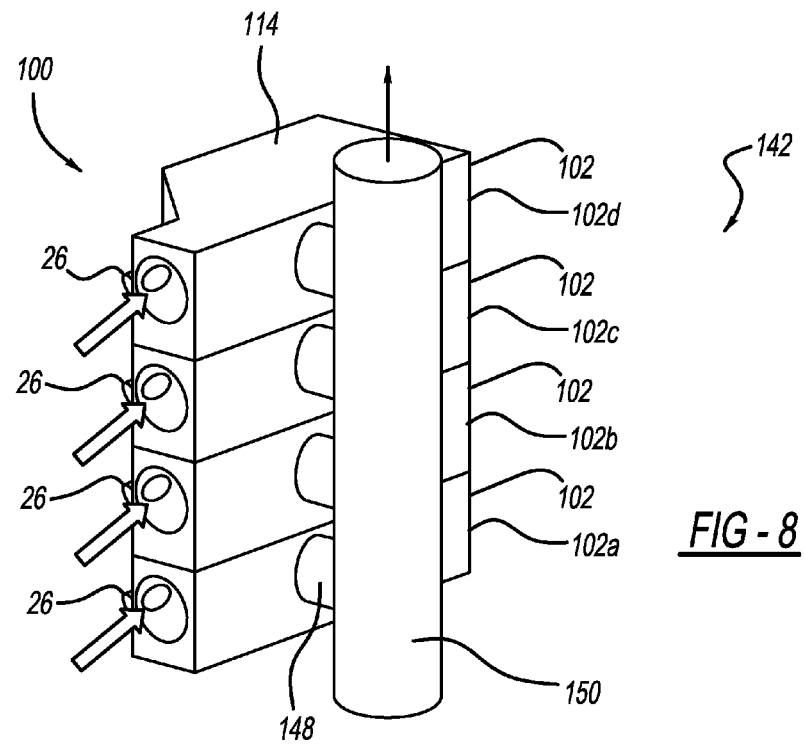
FIG. 8 is a perspective view of a vertically-configured modular exhaust after-treatment system in accordance with a principle of the present disclosure.
Figure 9:
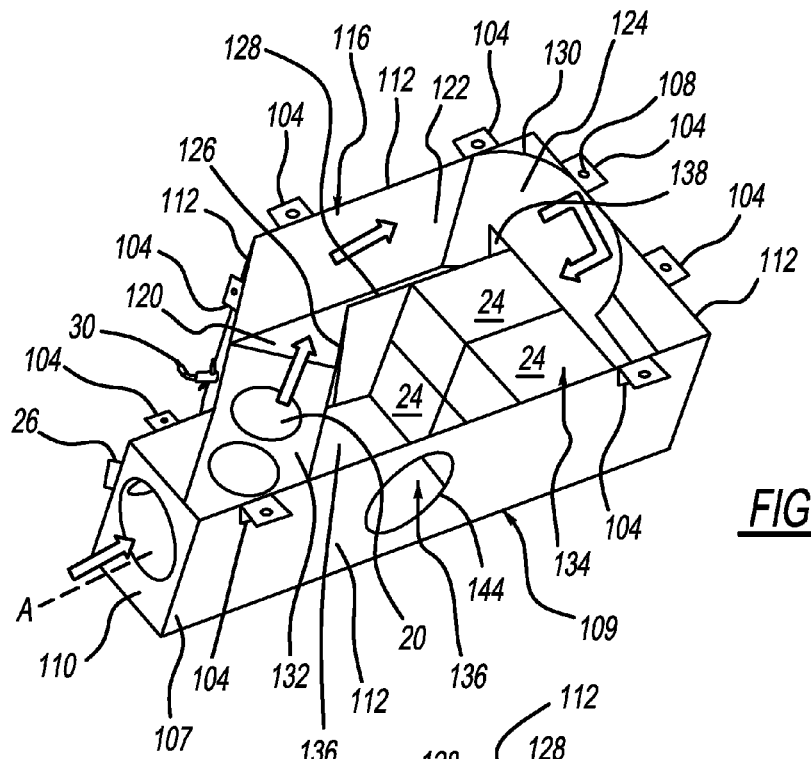
FIGS. 9 and 10 are perspective view of modules that can be used in either the horizontally- or vertically-configured arrays illustrated in FIGS. 7 and 8.
Figure 10:
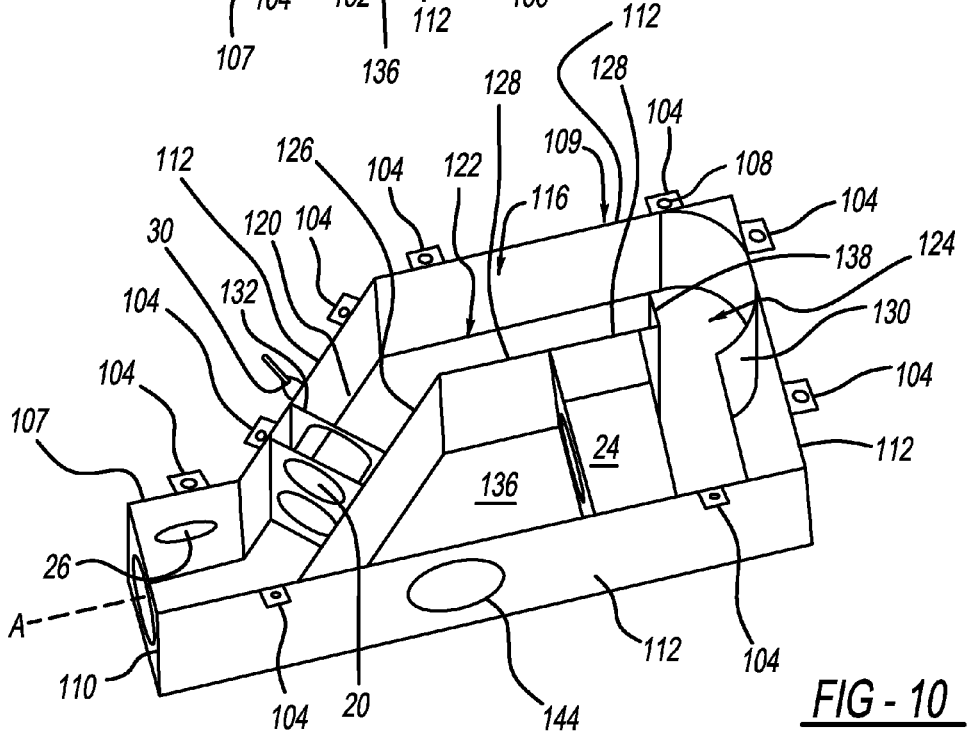

As best shown in FIGS. 7 and 8, modular after-treatment system 100 includes a plurality of after-treatment modules 102a-102d. Modules 102a-102d can be secured together in a stacked arrangement using L-shaped mounting brackets 104 (FIGS. 9 and 10). L-shaped mounting brackets 104 are formed about a periphery of modules 102a-102d, and may be secured to modules 102a-102d by welding, brazing, or any other attachment method suitable to ensure that mounting brackets 104 remain secured to modules 102a-102d. A through-hole 108 can be formed in each bracket 104 for receipt of a fastener (not shown) such a bolt or clamp that can rigidly secure each module 102a-102d together.

Modules 102a-102d each include an inlet passage 107 connected to or integral with housing 109. Inlet passages 107 are in communication with exhaust passage 16 through, for example, a manifold (not shown). Inlet passage 107 can be polygonal in shape, but may also be cylindrical without limitation. A mounting plate 110 allows a portion of exhaust passage 16 to be rigidly secured to inlet passage 107.

Housing 109 may comprise a plurality of exterior walls 112. A pair of cover plates 114 encloses and seals module housing 109. Inlet passage 107, mounting plate 110, exterior walls 112, and cover plates 114 may be formed of materials such as steel, aluminum, or any other type of material known to one skilled in the art that are able to withstand exposure to exhaust produced by engine 12 and exhaust treatment fluids that are used to treat the exhaust.

Inlet passage 107 can include a burner 26. Burner 26 raises exhaust temperatures as the exhaust enters modules 102a-102d to achieve light-off of the catalyst coated DOCS 20. Alternatively, if modules 102a-102d include DPFs 22, burners 26 can be used to regenerate the DPFs 22. Although only a single burner 26 is illustrated in the figures, it should be understood that a multiple burners 26 may be used to raise exhaust temperatures if desired.

Module housing 109 is in fluid communication with inlet passage 107 and includes a single flow path 116. Interior walls in conjunction with exterior walls 112 define flow paths 116. Flow path 116 can include first, second, and third portions 120, 122, and 124. First portion 120 of flow path 116 travels along first interior wall 126 that diverts flow path 116 away from an axis A of inlet passage 107. Second portion 122 of flow path 116 travels along a second interior wall 128 in a direction parallel with axis A. Lastly, third portion 124 of flow path 116 travels along a third interior wall 130. Third interior wall 130 can have a radius of curvature that initially diverts the exhaust flow in a direction back toward axis A, and then finally diverts the exhaust flow in a direction opposite to that which the exhaust enters inlet passage 107. The configuration of flow path 116 assists in lengthening the distance the exhaust must flow before being treated by the various exhaust treatment components.

A DOC 20 may be located in flow path 116. In the illustrated embodiment, DOCS 20 are located in first portions 120 of flow paths 116. A pair of mounting brackets 132 are used to support DOC 20 in housing 109 in first portion 120. Mounting brackets 132 may be welded between exterior wall 112 and first interior wall 126, or secured to exterior wall 112 and first interior wall 126 in any manner known to one skilled in the art. Although not illustrated in FIGS. 9 and 10, it should be understood that a DPF 22 can also be disposed in each flow path 116, if desired. Further, although DOC 20 is illustrated as being positioned in first portion 120 it should be understood that DOC 20 may located at a position further downstream without departing from the scope of the present disclosure.

Dosing modules 30 are located downstream from DOC 20 for dosing an exhaust treatment fluid such as urea into the exhaust stream. In the illustrated embodiment, dosing modules 30 are illustrated as being positioned to dose exhaust treatment fluid into first portion 120 (FIGS. 9 and 10). Dosing modules 30, however, may also be positioned relative to second and third portions 122 and 124 as well.

An array 134 including a plurality of SCRs 24 is located downstream from dosing modules 30 where third portions 124 ends. Although four SCRs 24 are illustrated in FIG. 9, it should be understood that any number of SCRs 24 can be used without departing from the scope of the present disclosure. For example, referring to FIG. 10, a single cylindrical SCR 24 is utilized. Further, although the SCRs 24 are illustrated in FIG. 9 as being parallelpiped, it should be understood that the cylindrical SCRs 24 of FIG. 10 may also be utilized. After passing through SCRs 24, exhaust enters discharge passage 136 where it may be expelled to the atmosphere in a direction transverse to flow paths 116.

Although not illustrated in the drawings, it should be understood that a mixing device can be located in flow path 116 at a position between dosing modules 30 and SCRs 24. Mixing devices assist in ensuring satisfactory intermingling of the exhaust and exhaust treatment fluid before entry into SCRs 24 where $NO_X$ is removed from the exhaust stream.

Another alternative for mixing the exhaust treatment fluid and exhaust is to incorporate a restrictor plate 138 between second and third portions 122 and 124. Restrictor plate 138 can be a in the form of a solid plate that reduces a width of flow path 116 up to 50%. By narrowing flow path 116, the flow velocity of the exhaust stream increases, which increases the intermingling between the exhaust treatment fluid and the exhaust.

Modules 102a-102d can be configured in a horizontal group 140 (FIG. 7) or in a vertical group 142 (FIG. 8). As best shown in FIGS. 9 and 10, an aperture 144 allows for exhaust to be discharged from after-treatment system 100 when modules 102 are stacked in the vertical group 142 or horizontal group 140.

Figure 11:
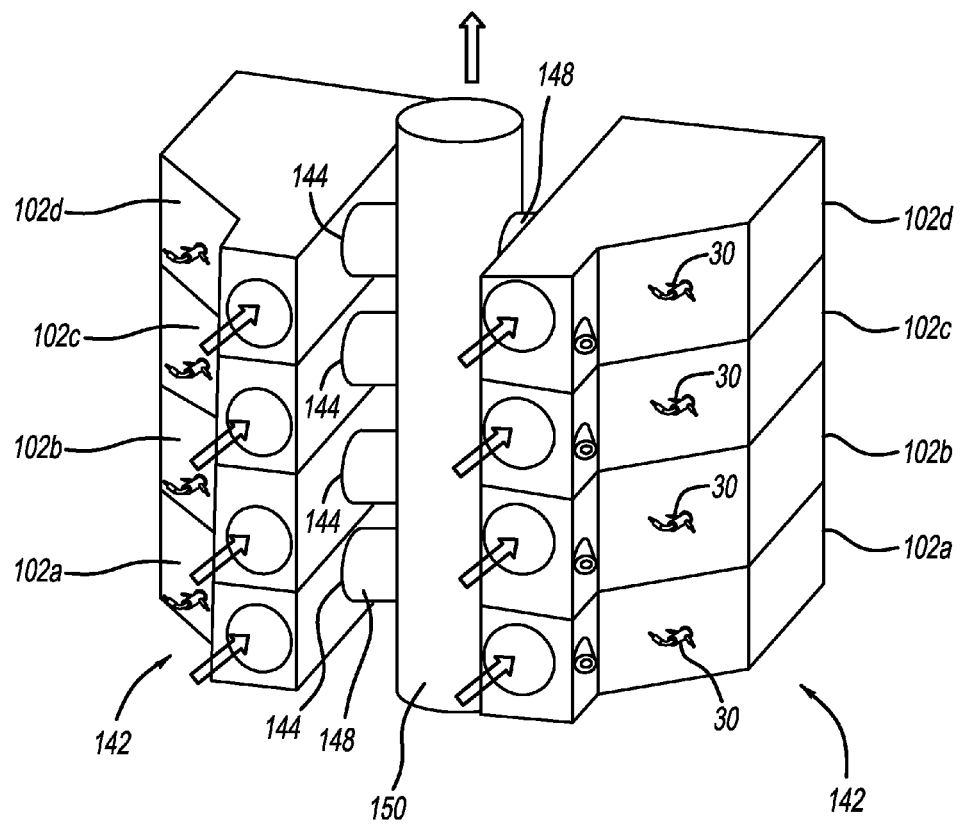
FIG. 11 is a perspective view of another modular exhaust after-treatment system in accordance with a principle of the present disclosure.

Referring to FIG. 11, another configuration includes stacking modules 102 in a vertical group 142 and utilizing apertures 144 to discharge exhaust through outlet conduits 148 into a primary discharge conduit 150. Mover, multiple vertical groups 142 can discharge exhaust into the primary discharge conduit 150. Although vertical groups 142 are illustrated as including four modules 102, the present disclosure contemplates that greater or fewer modules 102 may be stacked and designed to discharge treated exhaust into the primary discharge conduit 150.

As noted above, each module 102a-102d may be in fluid communication with each other through discharge passages 136. Although not illustrated in FIGS. 7-11, it should be understood that, similar to modular exhaust after-treatment system 50, module 102a, which may be located at the bottom in the stacked arrangement, can include a discharge manifold (not shown). The discharge conduit can communicates with a discharge manifold (not shown) that can collect the treated exhaust gases after exiting SCRs 24 and feed the discharge conduit, which communicates with discharge passage 136 of module 102b, which communicates with the discharge passage 136 of another module 102 or be emitted into the atmosphere.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A modular exhaust after-treatment system, comprising: a plurality of exhaust after-treatment modules, each module including a housing defining a non-linear flow path arranged between an inlet passage and an outlet passage, the non-linear flow path including a first portion adjacent the inlet passage that includes a first exhaust treatment component, a second portion downstream from the first portion, and a third portion downstream from second portion adjacent the outlet passage, the third portion including a second exhaust treatment component, wherein the plurality of exhaust after-treatment modules are secured to each other either horizontally or vertically, wherein the outlet passage of each module is in communication with a primary discharge conduit, further comprising a second plurality of exhaust after-treatment modules, each module of the second plurality of modules including a second housing defining a second non-linear flow path arranged between a second inlet passage and a second outlet passage, the second non-linear flow path including a fourth portion adjacent the second inlet passage that includes a third exhaust treatment component, a fifth portion downstream from the fourth portion, and a sixth portion downstream from fifth portion adjacent the second outlet passage, the sixth portion including a fourth exhaust treatment component.

2. A modular exhaust after-treatment system, comprising: a first after-treatment module and a second after-treatment module, each of the first and second modules including a housing defining a pair of non-linear flow paths arranged between an inlet passage and an outlet passage, the non-linear flow paths each including a first portion adjacent the inlet passage that includes a first exhaust treatment component, a second portion downstream from the first portion, and a third portion downstream from second portion adjacent the outlet passage, the third portion including a second exhaust treatment component, wherein the first and second after-treatment modules are coupled in a stacked arrangement, and the first after-treatment module includes an outlet manifold and outlet conduit in fluid communication with a discharge passage of the second after-treatment module.

3. The modular exhaust after-treatment system of claim 2, further comprising a restrictor plate that narrows the non-linear flow paths positioned between the second and third portions of the flow paths.

4. The modular exhaust after-treatment system of claim 2, wherein each of the first and second modules include a plurality of brackets arranged about a periphery of each module that secure the modules together in the stacked arrangement.

5. The modular exhaust after-treatment system of claim 2, wherein the first portion directs the exhaust flow in a direction away from an axis defined by the inlet passage, the second portion directs the exhaust flow in a direction parallel to the axis, and the third portion directs the exhaust flow through the second exhaust treatment component in a direction opposite to the flow through the inlet passage.

6. The modular exhaust after-treatment system of claim 2, wherein the first and second modules are stacked vertically.

7. The modular exhaust after-treatment system of claim 2, wherein the first exhaust treatment component is a diesel oxidation catalyst (DOC), and the second exhaust treatment component is a selective catalytic reduction (SCR) catalyst.

8. The modular exhaust after-treatment system of claim 2, further comprising a dosing module upstream of the SCR catalyst for dosing an exhaust treatment fluid into the non-linear flow paths.

9. The modular exhaust after-treatment system of claim 8, further comprising a restrictor plate that narrows the non-linear flow paths positioned between the second and third portions of the flow paths for intermingling the exhaust treatment fluid and the exhaust flow.

10. The modular exhaust after-treatment system of claim 2, further comprising a thermal enhancement device at the inlet passage.

11. The modular exhaust after-treatment system of claim 2, wherein the outlet passage of the first after-treatment module is oriented to direct the exhaust in a direction perpendicular to the flow through the first, second and third portions.

12. The modular exhaust after-treatment system of claim 11, wherein the outlet passage includes an outlet aperture extending through the housing, the outlet aperture being rotated 90 degrees from an inlet aperture of the inlet passage.

13. The modular exhaust after-treatment system of claim 2, wherein the housing defines first and second parallel passages that are interconnected at the inlet passage and interconnected at the outlet passage.

14. The modular exhaust after-treatment system of claim 13, wherein the first and second parallel passages circumferentially surround the outlet passage.

15. The modular exhaust after-treatment system of claim 2, wherein the non-linear flow path within the housing includes first and second spaced apart semi-circular walls directing the exhaust flow toward the inlet passage.

* * * * *